United States Patent Office 3,625,649
Patented Dec. 7, 1971

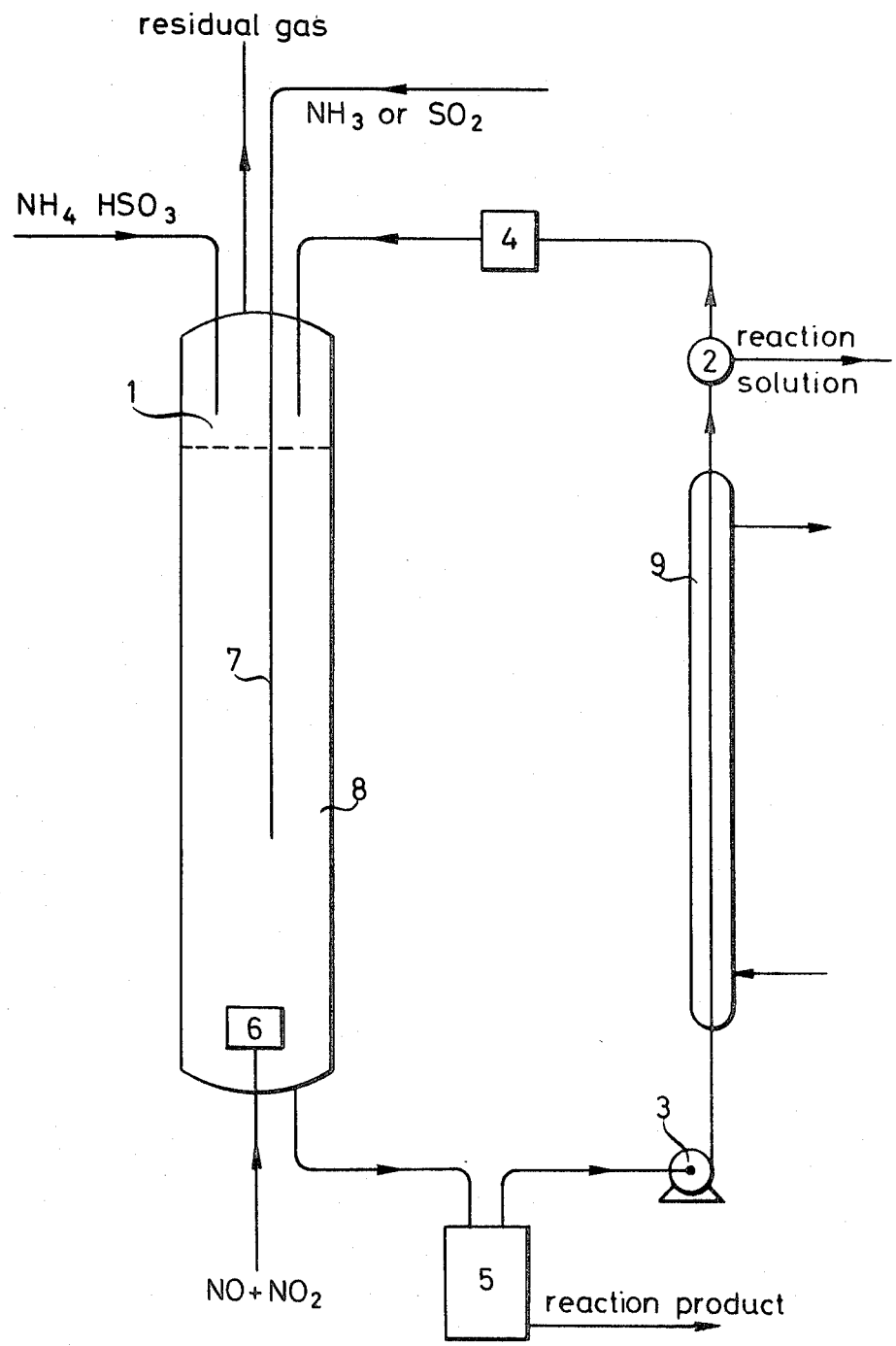

3,625,649
PROCESS FOR THE MANUFACTURE OF
SULFAMIC ACID
Heinz-Karl Hofmeister, Kelkheim, Taunus, and Rudolf
Kohlhass, Frankfurt am Main, Germany, assignor to
Farbwerke Hoechst Aktiengesellschaft vormals Meister
Lucius & Bruning, Frankfurt am Main, Germany
Filed Apr. 4, 1969, Ser. No. 813,557
Claims priority, application Germany, Apr. 11, 1968,
P 17 67 201.4
Int. Cl. C01b *17/00;* C01f *11/46*
U.S. Cl. 23—166
9 Claims

ABSTRACT OF THE DISCLOSURE

The invention relates to a process for the manufacture of sulfamic acid from nitrous gases and ammonium sulfite solution at elevated temperature. The starting products are reacted to yield a mixture consisting of the ammonium salts of nitrilotrisulfonic acid, imidodisulfonic acid and sulfamic acid, from which mixture sulfamic acid is obtained by reaction with strong acids.

The present invention relates to a process for the manufacture of sulfamic acid by reacting an ammonium sulfite solution with nitric oxides, more particularly waste gases containing nitric oxides.

Amidosulfonic acid or sulfamic acid is used in dyeing, metal etching and in fire-extinguishing substances. The salts of sulfamic acid are also used in various fields of application. Ammonium sulfamate, for example, is used as flameproofing agent and calcium amidosulfamate is a medicament.

Sulfamic acid is produced from chlorosulfonic acid and urea or from sulfur trioxide and ammonia (cf. German Auslegeschrift No. 1,132,549 and German Pat. 654,789).

The present invention provides a process for the manufacture of sulfamic acid which comprises reacting an aqueous ammonium sulfite solution having a pH value in the range of from 5.0 to 7.5 with gaseous nitric oxides at elevated temperature, separating the formed ammonium salts of nitrilotrisulfonic acid, imidodisulfonic acid and sulfamic acid and transforming the salts into sulfamic acid by reaction with strong acids.

The aqueous ammonium sulfite solution is mostly prepared from sulfur dioxide, ammonia and water and contains ammonium ions, sulfite ions and bisulfite ions. The proportion of ammonium sulfite to ammonium bisulfite in the solution varies according to the adjusted pH.

Suitable gaseous nitric oxides are mixtures of nitrogen monoxide, and nitrogen dioxide, nitric oxides-containing waste gases being preferred, especially those of the production of nitric acid.

The degree of oxidation of the gases containing nitric oxides should preferably be within the range of from 30% to 60%. To obtain an optimum yield of amidosulfonic acid the degree of oxidation is adjusted in the aforesaid range by adding oxygen or nitrogen monoxide.

The degree of oxidation (measured in percent) is defined as the following quotient:

$$\frac{NO_2 \cdot 100}{NO + NO_2}$$

A higher degree of oxidation leads to an undesired formation of ammonium sulfate. It is, therefore, advantageous with degrees of oxidation above 50% and with an excess of oxygen in the nitric gases, especially when the process is carried out in continuous manner, to add oxidation inhibitors. Suitable oxidation inhibitors are preferably para-substituted benzene compounds, for example hydroquinone, p-phenylene-diammonium dichloride or N,N'-dimethyl-p-phenylene-diammonium dichloride.

The gaseous nitric oxides are suitably reacted with the aqueous sulfite solution at a temperature in the range of from 30° C. to 70° C., preferably 40° C. to 50° C.

It is advantageous to combine the steps of preparing the solution and adjusting the pH.

Aqueous solutions of ammonium sulfite have a pH of from 6 to 7, the pH of a solution of about 40% weight percent $NH_4HSO_3$ being near 6.7.

The sulfite solution can thus be prepared by dissolving ammonium sulfite and adding ammonia or sulfur dioxide until the desired pH value is obtained.

According to a preferred embodiment the sulfite solution is prepared by introducing gaseous sulfur dioxide in aqueous ammonia. In this manner the desired pH of the solution can be directly adjusted by appropriate dosing of the amount of sulfur dioxide. Alternatively, the sulfite solution can be prepared directly in a column by reacting corresponding amounts of sulfur dioxide and ammonia with water and simultaneously adjusting the desired pH.

An automatic precision regulation of the pH range is expedient. For this purpose magnetic valves are regulated by a pH measuring point so that corresponding amounts of ammonia or sulfur dioxide are added to adjust the desired pH value of the solution.

The gases containing nitric oxides react with the ammonium sulfite solution to form ammonium nitrilotrisulfonate, ammonium imidodisulfonate and ammonium sulfamate. Small amounts of ammonium sulfate may be formed as by-product. The salts of nitrilotrisulfonic acid, imidodisulfonic acid and sulfamic acid are dissolved in the reaction solution. The solution is removed from the reaction vessel and reacted in a separate vessel with nitric acid or sulfuric acid whereby sulfamic acid is obtained.

It is advantageous to prepare the aqueous ammonium sulfite solution with a total salt concentration of from 30 to 75% (ammonium bisulfite and ammonium sulfite).

After the introduction of a certain amount of nitric oxides into the solution with this high concentration of ammonium sulfite and bisulfite the concentration of ammonium nitrilotrisulfonate and ammonium imidodisulfonate becomes so high that both ammonium salts crystallize out. The crystals of ammonium nitrilotrisulfonate and ammonium imidodisulfonate may contain small amounts of ammonium sulfamate, besides ammonium sulfate, ammonium sulfite and water.

The reaction product precipitated in solid form can be easily separated from the sulfite solution and transferred into a separate vessel in which it is reacted with strong acids to yield amidosulfonic acid. As strong acids nitric acid and sulfuric acid are preferably used. The mixture of reaction product and acid is reacted for about 1 hour at 50 to 60° C. whereby crystalline sulfamic acid is formed.

The process of the invention is preferably carried out in continuous manner. The sulfite solution is then pumped in a cycle. The accompanying drawing illustrates by way of example a flow schemet suitable to carry out the process in continuous manner.

Referring to the drawing:

A column 8 provided with a frit 6 and an immersion tube 7 is charged with ammonium sulfite solution at the head 1. Ammonia and sulfur dioxide, respectively, are introduced under a slight superatmospheric pressure through immersion tube 7. The nitric oxides-containing gases enter the column through frit 6. After reaction they leave the column at the head 1 as residual gas having a very low content of nitric oxide. The solution which contains the ammonium salts of nitrilotrisulfonic acid and imidodisulfonic acid in suspension is transferred after the reaction into a settling vessel 5 where the sparingly soluble ammonium salts are separated.

The clear solution is recycled into the column by means of a pump 3 through a heat exchanger 9 and a measuring point 4. The measuring point controls the pH value of the solution and adjusts the value within the defined range by the addition of corresponding amounts of ammonia or sulfur dioxide through immersion tube 7. Instead of one immersion tube 7, two immersion tubes may also be used.

Between the heat exchanger 9 and measuring point 4 a branch pipe 2 is suitably installed where a portion of the cycled solution can be removed. This is only necessary if the solution reaches too high a sulfate content.

When a portion of the recycled solution is removed through branch pipe 2 a corresponding amount of fresh ammonium sulfite solution must be introduced into the cycle at the head of the column 1.

The addition of fresh sulfite solution at the head of the column 1 and the discharge of the reacted solution through the branch pipe are regulated in such a manner that the volume of liquid in the cycle remains constant.

When waste gases containing nitric oxides are reacted, column 8 is a packed column and settling vessel 5 is a centrifuge.

When gases having a high concentration of nitric oxides are used, column 8 is preferably a bubble tray column to avoid clogging by the crystallized ammonium salts of nitrilotrisulfonic acid and imidodisulfonic acid.

The mixture of ammonium salts of nitrilotrisulfonic acid and imidodisulfonic acid separated in settling vessel 5 is discharged periodically or continuously and hydrolyzed in a separate vessel with nitric acid or sulfuric acid to yield sulfamic acid.

The portion of the solution separated through branch pipe 2 contains, besides ammonium sulfate, ammonium salts of sulfamic acid, of imidosulfonic acid and of nitrilotrisulfonic acid as well as unreacted ammonium sulfite. Sulfamic acid is obtained from this solution by adding strong acids whereby sulfur dioxide is set free and recycled into the column through immersion tube 7.

According to the process disclosed in German Auslegeschrift 1,253,686, ammonium sulfate is formed in the reaction of an ammonium sulfite solution with nitric oxides. Moreover, the formation of ammonium nitrate or ammonium nitrite could have been expected.

It is surprising, however, that by reacting ammonium sulfite with nitric oxides within a pH value and temperature range according to this invention, a mixture of the ammonium salts of sulfamic acid, imidosulfonic acid and nitrilotrisulfonic acid is formed, which can easily be transformed into sulfamic acid by treatment with strong acids like nitric or sulfuric acid.

An important advantage of the process of the invention resides in the fact that nitric oxides contained in waste gases can be used. A further advantage is that the ammonium sulfite solution can also be produced from cheap industrial gases, i.e. ammonia and sulfur dioxide. It may even be possible to obtain the ammonium sulfite solution from the purification process of sulfur dioxide-containing industrial gases.

Hence, it follows that the process of the invention opens up a new way for the purification of industrial waste gases whereby sulfamic acid is obtained as a valuable final product.

The following examples serve to illustrate the invention but they are not intended to limit it thereto.

EXAMPLE 1

A packed column having a diameter of 5 cm. and a height of 100 cm. provided at the bottom with a frit and an immersion tube inserted over the head, was charged with 1,050 milliliters of a sulfite solution. To prepare the sulfite solution sulfur dioxide (from roasting) was introduced into an aqueous ammonia solution until a sulfite content of about 70% (calculated as ammonium bisulfite) had been reached. By adding ammonia and water the pH of the solution was adjusted to a valve between 6.5 and 6.8. The sulfite solution had the following composition: 47.5% of ammonium bisulfite, 5.2% of ammonia, 1.3% of ammonium sulfate and 46.0% of water.

Through the frit 250 liters of nitrous waste gas were introduced per hour into the column. The waste gas, which was forced into the column under a pressure of 1.1 to 2 atmospheres gauge, contained 0.21 to 0.23% by volume of nitric oxides, the mean degree of oxidation being 40%. When the waste gas bubbled through the packed column the nitric oxides reacted with sulfite. The residual gases leaving the column at the head contained less than 0.05% by volume of nitrogen monoxide. Nitrogen dioxide could not be detected in the escaping residual gas. After the reaction the solution contained ammonia, ammonium bisulfite and ammonium sulfate in addition to nitrilotrisulfonate, imidodisulfonate and sulfamate. Ammonium nitrilotrisulfonate and ammonium imidodisulfonate crystallized out as reaction products. They remained suspended in the solution. The suspension was transferred to the settling vessel (centrifuge) where the solid reaction product was separated and removed from the cycle.

The solution was then pumped into the heat exchanger which maintained the temperature of the solution flowing in a cycle at a constant level of 50° C. Through the branch pipe 20 milliliters of the solution were removed per hour. The greater portion of the solution flowed to the measuring point where the pH of the cycled solution was measured and automatically regulated according to the value obtained by adding ammonia or sulfur dioxide through the immersion tube to a value in the range of from 6.5 to 6.8. At the head of the column the solution reentered the column at a constant temperature of 50° C.

At the head of the column fresh sulfite solution was introduced to replace the amount branched off (about 20 milliliters per hour). The total amount of liquid in the cycle must remain constant.

In the settling vessel 7.6 grams of the reaction product were separated per hour. The reaction product consisting of 83.5% of ammonium nitrilotrisulfonate, ammonium imidodisulfonate and ammonium sulfate was discharged and hydrolyzed in a separate vessel.

For this purpose, 100 grams of the reaction product were reacted with about 200 grams of nitric acid of 60% strength at a temperature in the range of from 50 to 70° C. Pure crystalline sulfamic acid was obtained.

The branched off portion of the solution (about 20 milliliters per hour) was reacted with five times the amount of nitric acid of 60% strength, whereby crystalline sulfamic acid was likewise formed. Simultaneously, sulfur dioxide was set free, which was used to regulate the pH value, and reintroduced into the column through the immersion tube.

The total yield of sulfamic acid amounted to 2.3 to 2.5 grams per hour, corresponding to 80% of the theory, calculated on the reacted nitric oxides, and about 60 to 65% of the theory, calculated on the sulfite used.

EXAMPLE 2

In the manner described in Example 1, 70 liters of gas containing nitric oxides were passed per hour through the column designed as a bubble tray column. The gases were introduced under a pressure of 1.9 to 2.5 atmospheres. They contained 11.6% by volume of nitric oxides, the means degree of oxidation being 34%.

Corresponding to the higher content of nitric oxides in the gas 160 milliliters of solution were branched off per hour and 160 milliliters of fresh ammonium sulfite solution were introduced per hour at the head of the column.

During the course of one hour 53 grams of a reaction product composed of 92% of ammonium nitrilotrisulfonate, 5.2% of ammonium imidodisulfonate and 2.8% of ammonium sulfate separated in the setting vessel.

The amount of reaction product obtained per hour (53 grams) and the separated solution (160 milliliters) were reacted with nitric acid of 60% strength whereby 16.7 to 19.2 grams of crystalline sulfamic acid were obtained per hour. The yield of sulfamic acid amounted to 70–80% of the theory, calculated on the nitric oxides introduced into the column, and 76–77% of the theory, calculated on the sulfite used.

EXAMPLE 3

The reaction was carried out as described in Example 2. The gas was introduced under a pressure of 2.5 to 3.6 absolute atmospheres. About 105 milliliters of solution were branched off per hour, and at the head of the column about 105 milliliters of a weak acid solution (pH 4.5) of ammonium bisulfite of 70% strength were added per hour. Besides the small amount of ammonia required for precision regulation of the pH, 10 liters per hour of ammonia were continuously introduced into the column through the immersion tube. No liquid was branched off. The reaction solution was worked up as described in Example 2. 13.6 grams of sulfamic acid were obtained per hour, corresponding to 57% of the theory, calculated on the nitric oxides introduced into the column, and 63% of the theory, calculated on the sulfite used.

EXAMPLE 4

The reaction was carried out as described in Example 2. As soon as the stationary state was reached no more solution was branched off. At the head of the column only 10 milliliters of water were introduced into the column per hour. Besides 70 liters of nitrous gases introduced per hour through the frit, 19 liters of sulfur dioxide and 10 liters of ammonia were introduced per hour.

A solid reaction product was obtained in an amount of 65 to 75 grams per hour. The reaction product was separated from the reaction solution in the settling vessel. The reaction product was composed of 64.5% of ammonium nitrilotrisulfonate, 9.8% of ammonium imidodisulfonate, 3.6% of ammonium sulfamate and 15.8% of ammonium sulfate. The remainder consisted of ammonium bisulfite and water.

In the reaction with nitric acid of 60% strength, 15.3–17.5 grams of crystalline sulfamic acid were obtained per hour, corresponding to a yield of 64–73%, calculated on the nitric oxides, and 56–66%, calculated on the introduced sulfur dioxide.

As the reaction product of this example had a small content of sulfite, sulfur dioxide was set free in the reaction with nitric acid and reintroduced into the column through the immersion tube.

EXAMPLE 5

The reaction was carried out in an apparauts as described in Example 1 but having larger dimensions. The packed column used had a length of 3 meters and a diameter of 10 centimeters and was packed with Raschig rings having a diameter of 8 millimeters. The lower part of the column was connected with a flask having a capacity of 50 liters. At the head of the column a condenser was mounted to avoid losses of water.

The pH of the ammonium sulfite solution was adjusted to a value of 6.5. In the apparatus 300 liters of solution were recycled. The temperature in the packed column was in the range of from 60 to 65° C.

As nitrous gases, the waste gases of the production of nitric acid having a mean degree of oxidation of 38% were used. The waste gas contained 0.06 to 0.2% by volume of nitric oxides ($NO+NO_2$) and 5 to 1.5% by volume of oxygen. The waste gas was introduced into the column at a rate of 5 cubic meters per hour under a pressure of about 1.1 atmospheres.

The results obtained are summarized in the following table. The residual gas leaving the apparatus was free from $NO_2$ and still contained the indicated amount of NO. The results show the advantageous reduction of the content of nitrogen dioxide in waste gases by the process of the invention for the manufacture of sulfamic acid.

| Concentration of NO and $NO_2$ in waster gas (p.p.m.) | Concentration of NO in residual gas (p.p.m.) | Yield of sulfamic acid (g./l.) |
| --- | --- | --- |
| 750 | 230 | 3.1 |
| 1,100 | 270 | 6.6 |
| 1,500 | 345 | 13.2 |
| 2,000 | 410 | 19.4 |

What is claimed is:

1. A process for the manufacture of sulfamic acid which comprises reacting, at a temperature in the range of from 30 to 70° C., an aqueous ammonium sulfite solution having a pH value in the range of from 5.0 to 7.5 with gaseous nitric oxides, the degree of oxidation of the nitric oxides being in the range of from 30 to 60%, separating the ammonium salts of nitrilotrisulfonic acid, imidodisulfonic acid and sulfamic acid thus formed and converting them into sulfamic acid by reaction with nitric acid or sulfuric acid.

2. The process of claim 1, wherein waste gases containing nitric oxides are reacted.

3. The process of claim 1, wherein the pH of the aqueous ammonium sulfite solution is adjusted by adding ammonia or sulfur dioxide.

4. The process of claim 1, wherein the aqueous ammonium sulfite solution has a total concentration of from 30 to 75%.

5. The process of claim 1, wherein the gaseous nitric oxides are continuously introduced into the aqueous ammonium sulfite solution and the ammonium salts crystallizing out of nitrilotrisulfonic acid, imidodisulfonic acid and sulfamic acid are continuously removed.

6. The process of claim 1, wherein the gaseous nitric oxides, $SO_2$ and $NH_3$ are continously introduced into the ammonium sulfite solution.

7. The process of claim 1, in which unreacted aqueous ammonium sulfite solution is recycled.

8. The process of claim 7, wherein the recycled ammonium sulfite solution contains ammonium salts of nitrilotrisulfonic acid, imidodisulfonic acid and sulfamic acid.

9. The process of claim 1, wherein there is added to the aqueous ammonium sulfite solution an oxidation inhibitor selected from the group consisting of hydroquinone, p-phenylene-diammonium dichloride and N,N'-dimethyl-p-phenylene-diammonium dichloride.

References Cited

UNITED STATES PATENTS 3,188,175  6/1965  Nychka _____ 23—166

FOREIGN PATENTS 647,316  12/1950  Great Britain _____ 23—114
48,427  10/1964  Poland _____ 23—166

OSCAR R. VERTIZ, Primary Examiner

G. ALVARO, Assistant Examiner

U.S. Cl. X.R.

23—114